United States Patent [19]
Hersh

[11] Patent Number: 5,839,385
[45] Date of Patent: Nov. 24, 1998

[54] TENSION APPLYING DEVICE

[76] Inventor: Stephen A. Hersh, 177 B Alohi Pl., Pukalani, Maui, Hi. 96768

[21] Appl. No.: 702,885

[22] Filed: Aug. 26, 1996

[51] Int. Cl.$^6$ ...................................................... B63H 9/04
[52] U.S. Cl. ...................... 114/102; 24/131 R; 24/129 R; 114/39.002; 114/109; 114/218
[58] Field of Search .................... 294/26, 1.1; 24/131 R, 24/130, 129 C, 129 R; 114/109, 39.2, 218, 102

[56] References Cited

U.S. PATENT DOCUMENTS

| | | | |
|---|---|---|---|
| 516,185 | 3/1894 | Carver | 24/131 R |
| 1,212,485 | 1/1917 | Hill | 24/130 |
| 2,252,243 | 8/1941 | Zoppelt | 24/130 |
| 5,220,709 | 6/1993 | Boyland | 24/130 |

*Primary Examiner*—Ed L. Swinehart

[57] ABSTRACT

A device and methods to incrementally tension a line. The fixed end of the line is secured to a load and the free end is wrapped one-and-a-half times around and terminating between a pair of essentially parallel hooks that have the freedom to converge in the gap. When the line is tensioned by applying a force to the device, the hooks are pulled together arresting the movement of the line. The device is then displaced a distance which constitutes one incremental pull. The tensioned line is then cleated off or the load otherwise secured and the device can then be returned to its starting point. The hooks, now relaxed, allow for the accumulated slack to be pulled through them by tensioning the free portion of the line. The process can be repeated until the desired tension is accumulated or the load displaced the required distance. When no more incremental$\pi$ pulls are required and there is no tension in the line, the line can be easily slipped off the hooks. The device can also be used to hold a line in tension when attached to an anchor.

9 Claims, 4 Drawing Sheets

TENSION APPLYING DEVICE

This invention relates generally to the field of devices which are temporarily held in place by the tension of lines, such as hand tools used to adjust the tension of lines. More particularly, this invention relates to a device, which in many embodiments is portable, and method of use thereof, to quickly and correctly set up and adjust the tension of lines, in either situations such as those comprising the rigging of a sail boat, such as a sail board, particularly the down haul, by way of engagement means attached to a force applying device, or, alternatively, using hook means as a readily detachable grab which can also be a load bearing device.

Rigging a windsurf sail requires pulling or down hauling the sail onto a flexible mast with a length of line. The amount of force to do this varies with the kind and make of the sail, the stiffness of the mast and the mechanical advantage of the cleat/pulley system at the base of the mast. The amount of force necessary usually exceeds the range that can be comfortably and safely bare-handed and for this reason devices exist to assist in down hauling a wind surf sail.

Existing down haul aids fall into two categories: Those having a mechanical advantage of one and those with a mechanical advantage greater than one. The tensions needed to down haul the majority of wind surf sails can be achieved by a person using an aid with a mechanical advantage of one and good body mechanics. The invention has a mechanical advantage of one and the following discussion deals with those aids with a mechanical advantage of one.

One device is named Clam Cleat and marked as patented, although with no patent number. This device is probably the best of the existing single hand toothed cleat tools. Basically, this tool comprises a toothed cleat and integrated aluminum handle. It attaches to the rope easily and repositions easily. It does not have a particularly comfortable grip. Its single handle grip does not make for the strongest pull possible even when using a hand over fist grip.

However, this sort of device has two major failings. First, the failure of a cleat while applying force, pulling, could result in violent release of the rope causing rope burn, or worse injury to hand. A similar tool with a plastic handle and molded in metal cleat was known for failing and causing injury. Second, in general, toothed cleats chew up down haul rope, a defect shared with all such devices which use cleats.

Another device is known as the Power-Trim, no patented marking and no trademark. This device has a two handed grip with a large through handle hole to thread a down haul line through which can then engage a toothed cleat. The device attaches fairly easily, but adjusts slowly, and shares the common deficiencies of all toothed cleat tools. Another tool found is a substantial copy of Power-Trim, but with better workmanship. The only design change is actually negative in that it is harder to attach due to the small through handle hole.

None of the devices known to exist provide an easy to use tension adjusting device which does not unnecessarily damage or tend to unnecessarily destroy the rigging lines of the sail board. The invention is the result of the need for a better device to down haul a wind surf sail.

BACKGROUND OF THE INVENTION

Rigging a windsurf sail requires pulling or down hauling the sail onto a flexible mast with a length of line. The amount of force to do this varies with the kind and make of the sail, the stiffness of the mast and the mechanical advantage of the cleat/pulley system at the base of the mast. The amount of force necessary usually exceeds the range that can be comfortably and safely bare-handed and for this reason devices exist to assist in down hauling a wind surf sail.

Existing down haul aids fall into two categories: Those having a mechanical advantage of one and those with a mechanical advantage greater than one. The tensions needed to down haul the majority of wind surf sails can be achieved by a person using an aid with a mechanical advantage of one and good body mechanics. The invention has a mechanical advantage of one and the following discussion deals with those aids with a mechanical advantage of one.

One device is named Clam Cleat and marked as patented, although with no patent number. This device is probably the best of the existing single hand toothed cleat tools. Basically, this tool comprises a toothed cleat and integrated aluminum handle. It attaches to the rope easily and repositions easily. It does not have a particularly comfortable grip. Its single handle grip does not make for the strongest pull possible even when using a hand over fist grip.

However, this sort of device has two major failings. First, the failure of a cleat while applying force, pulling, could result in violent release of the rope causing rope burn, or worse injury to hand. A similar tool with a plastic handle and molded in metal cleat was known for failing and causing injury Second, in general, toothed cleats chew up down haul rope, a defect shared with all such devices which use cleats.

Another device is known as the Power-Trim, no patented marking and no trademark. This device has a two handed grip with a large through handle hole to thread a down haul line through which can then engage a toothed cleat. The device attaches fairly easily, but adjusts slowly, and shares the common deficiencies of all toothed cleat tools. Another tool found is a substantial copy of Power-Trim, but with better workmanship. The only design change is actually negative in that it is harder to attach due to the small through handle hole.

None of the devices known to exist provide an easy to use tension adjusting device which does not unnecessarily damage or tend to unnecessarily destroy the rigging lines of the sail board. The invention is the result of the need for a better device to down haul a wind surf sail.

DESCRIPTION OF THE PREFERRED EMBODIMENT

Figure 1:
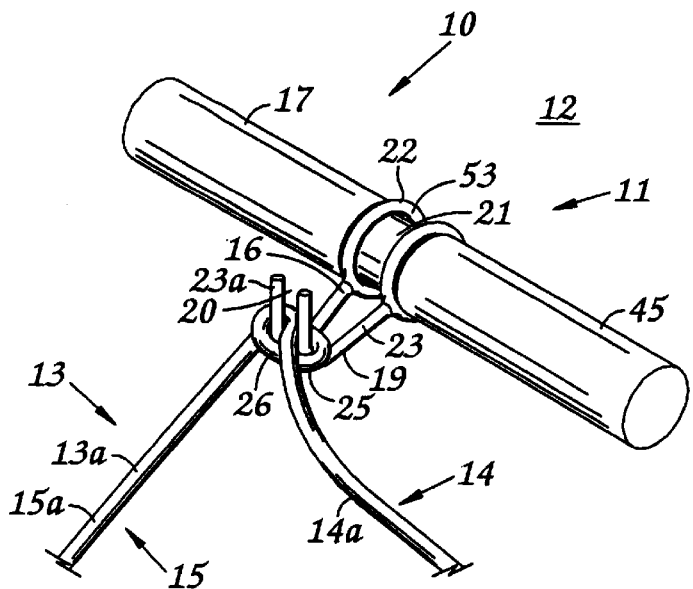
FIG. 1 Shows an embodiment of the device disclosed in the subject invention having a rigid handle and independently rotating engagement means.

The subject invention, as shown in FIGS. 1–4, and referred to throughout by the general reference 10, comprises a force applying device 11, and a method 12 of employing device 11 to adjust the tension in a line 13, such as a down haul line 13a, having a free portion 14, 14a, and a secured portion 15, 15a. The precise manner in which the free portion 14 is secured to device 11 is discussed in more detail below.

Figure 2:
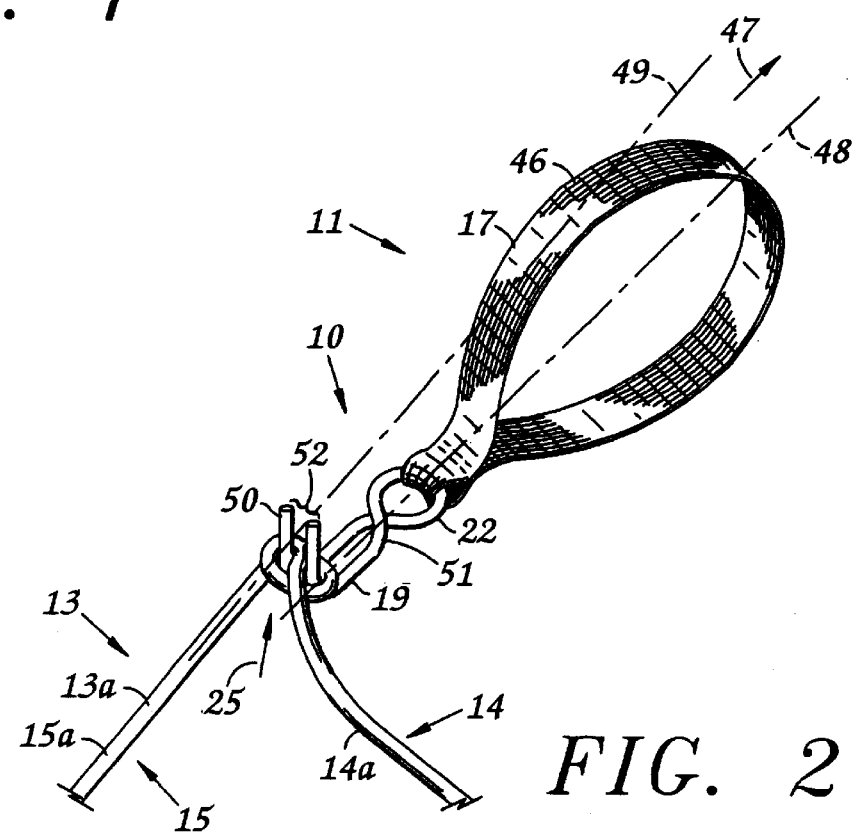
FIG. 2 Shows an alternate embodiment of the subject invention incorporating a wrist strap and non-independently rotating engagement means.

As shown in FIG. 1 and FIG. 2, the device 11 is comprised of line engagement means 16, and anchoring means 17. In many configurations anchoring means is equivalent to force applying means, although the anchoring means could be fixed in any manner known to the art, while tension is applied directly to the line 13 and line 13 passes through engagement means 16 while the tension of the secured portion 15 of line 13 is being increased.

Figure 3:
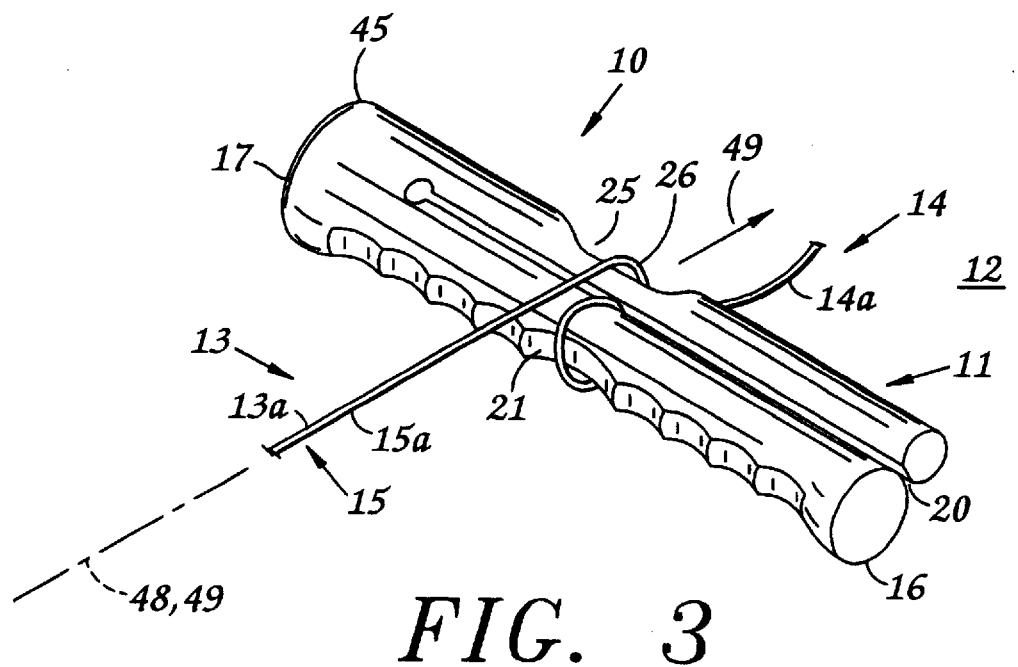
FIG. 3 Shows another alternative embodiment of the subject invention incorporating integrally formed engagement means wherein the line engagement means are fixed relative to each other and the gap therebetween narrows to almost zero, as well as the same structure functioning as line engaging and force applying means.
Figure 3A:
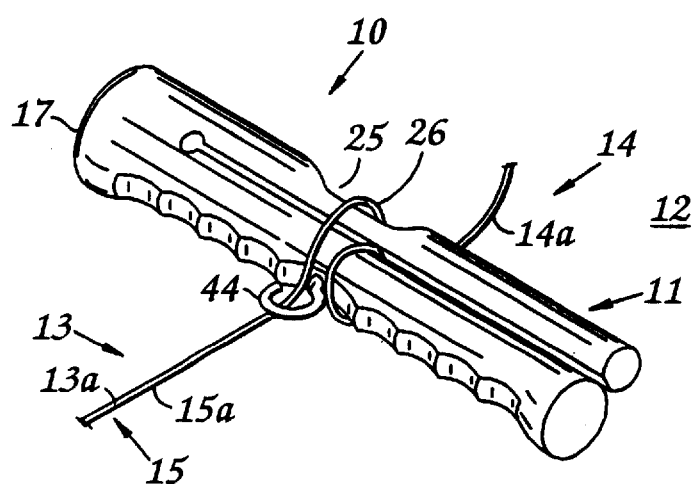

Engagement means 16 is comprised of attachment means 19, and gap 20 intermediate attachment means 19. As shown in FIG. 1, anchoring means 17 also comprises body means 21, and connecting means 22 which transmits force from anchoring means 17 to engagement means 16. Generally, engagement means 16 comprise attachment means 19 which is generally comprised of a first member 23, and a second member 23 a. As shown in FIG. 3 engagement means 16 may be formed from a single piece of plastic or other suitable material. First member 23 and second member 23a may be, but need not be, either symmetrical, or mirror images of one another.

As shown in FIGS. 1–3, device 11 is attached to line 13 by means of hitch 25. Hitch 25 wraps line 13 around both member 23 and 23a of attachment means 19, and places interacting portion 26 of the free portion 14 of line 13 with gap 20. As shown in FIGS. 1–3, the configuration of gap 20, while tension is being applied to line 13 is critical. Gap 20 must provide static friction against portion 26 of line 13 when tension is being applied to the secured portion 15 of line 13.

Figures 4, 4A:
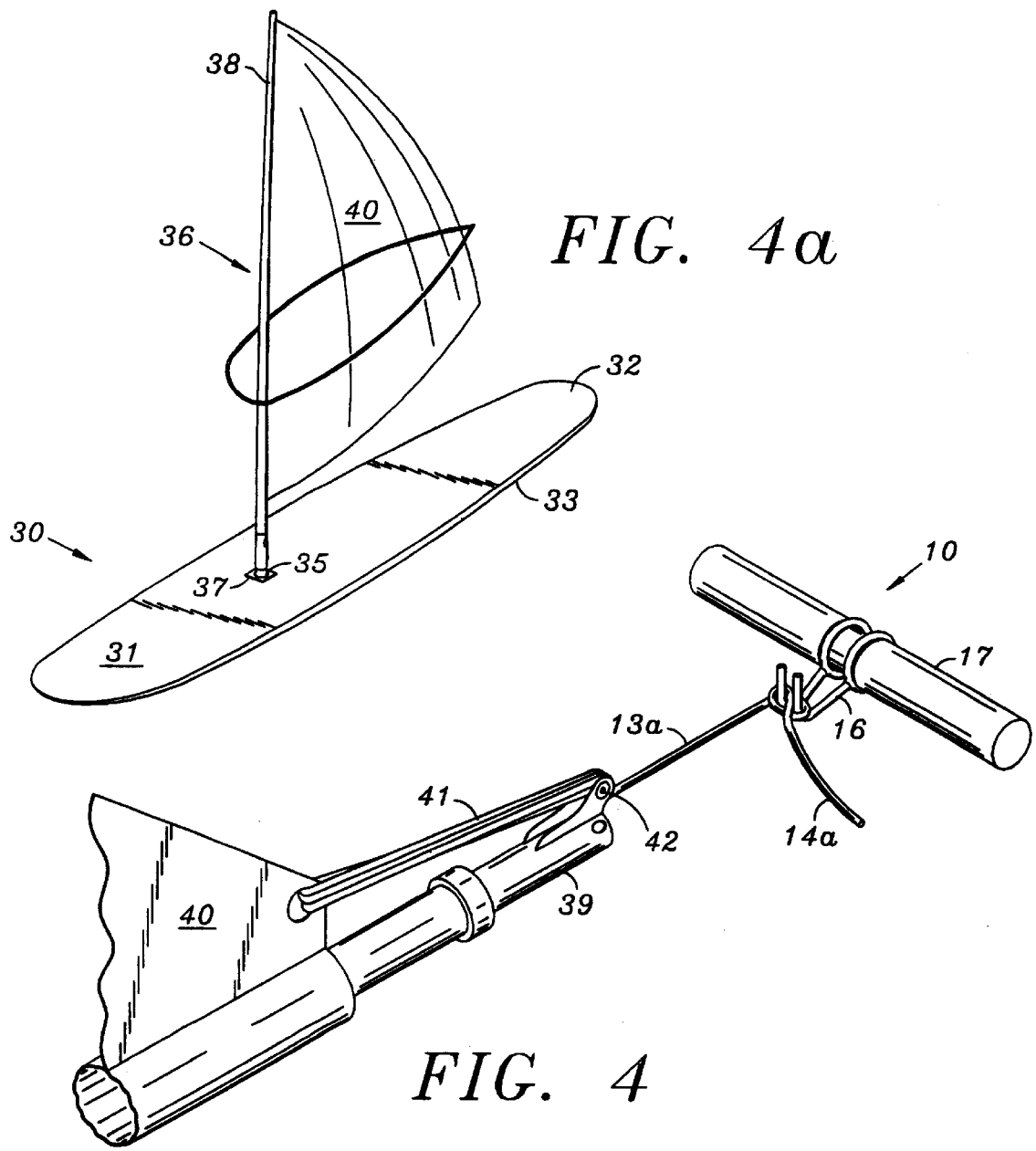
FIG. 4 Shows the device disclosed in the subject invention employed in the method disclosed in the subject invention of adjusting the rigging of a sail board sail.

Due to the operational requirements of a sail board 30, as generically illustrated in FIG. 4, line 13, and down haul 13a, are preferably substantially inelastic within the tension ranges contemplated to be within the useful range of the subject invention. Sail board 30 is comprised of board 31, having a top side 32, and a bottom side 33, universal joint 35 mounted on the top side 32 of board 31, flexible mast 36, having a base 37 and a top 38 which is operatively attached to board 31, by means of mast extension 39 so that base 37 of mast 36 pivotally coacts with universal joint 35, and the top 38 of mast 36 is remove from universal joint 35, and sail 40 which is attached to sail board 30 by means of attachment to mast extension 39 by means of rigging 41 which comprises of down haul 13a, the fixed end 15a of which is attached to securing means 42 on mast extension 39 prior to tension being applied to the down haul 13a, which is still attached to securing means 42 after the desired degree of tension is applied to down haul 13a, by pulling on the free, or less tensioned portion 14 of line 13.

An unusual feature of the subject invention 10 is that the free portion 14 of line 13 may freely pass through engagement means 16, but that once such free portion of the line 13 is released, tension in that portion of line 13 between the fixed end 15, and the then current purchase point on line 13 is substantially maintained. This may take place whether anchoring means 17 are fixed or mobile. Further, this state of events holds true regardless of the precise mechanism employed in applying tension to line 13.

As shown in FIGS. 1–3 the configuration of anchoring means 17 may be quite varied, and, in fact, if desired, engagement means 16 and anchoring means 17 may be integrally fashioned from a single piece of material. As shown in FIG. 3, if there is no physical separation between engagement means 16, and anchoring means 17, the addition of stabilizer 44 is highly desirable. As shown in FIG. 1, anchoring means 17 may comprise force applying handle means 45. However, as shown in FIG. 2, anchoring means 17 may also comprise force applying strap means 46. Further, as shown in FIG. 3, engagement means 16 and anchoring means or force applying means may even comprise the same structure.

The configuration of engagement means 16 may also be quite varied. Engagement means 16 must both allow for the connection of portion 26 to device 11, and to assure that when tension is applied to the secured portion 14 of line 13, by means of applying force 47, along axis 48 to anchoring means 17 of device 11, that device 11 does not slip relative to line 13, as well as allowing device 11 to be readily moved towards the more tensioned end of line 13, without releasing the tension thereof, after line 13 is temporarily fixed, to allow for such repositioning. In further part this is done by fixing the shape of gap 20. Gap 20 is shaped so that as force 47 is applied to device 11 along axis 48, the operative axis 49 of gap 20 may be at an angle to axis 48 due to the resultant vector from force 47 and the reactive tension in line 13. The amount of force 47 which must be applied to device 11 in order to obtain a given component vector along axis 48 is minimized as the angle between axis 48 and operative axis 49 is minimized. Applicant believes that, in those configurations of device 11 which do not contain a substantial axial length along axis 48, that device 11 would be dynamically unstable without stabilizer 44, which provides a substantial length of line 13 along, or parallel to axis 48.

Further, gap 20 has a first end 50 which is proximate portion 26 and remote from force applying means 17, and a second end 51 which is remote portion 26 and proximate anchoring means 17. The width 52 of gap 20 varies, and decreases as end 50 is approached, and may in fact approach zero The effect of this configuration is that as force 47 is applied to line 13, any undesired slippage of portion 26 of line 13 towards the fixed portion of line 13 is arrested by the configuration of gap 20 and the interaction between line 13 and engagement means 16.

The configuration of engagement means 16 is also unimportant so long as line 13 can be snugly attached thereto. For example, one or both of attachment means 19 may have hooks with flared tips to expedite that attachment of device 11 to line 13, by means of hitch 25, or need not have any hook at all, as shown in FIG. 3. Additionally, engagement means 16 may be either rotatable or fixed. Rotatable means 16 may be independently rotatable, as shown in FIG. 1, or laterally and rotationally relatively fixed, as shown in FIGS. 2 and 3. If such rotatable means 16 are employed, when force 47 is applied, means 16 will rotate so that force 47 is applied to line 13 in a linear fashion, and gap 20 will orient itself in the fashion described above so that means 16 may securely engage line 13 for so long as is desired.

If, on the other hand, engagement means 16 are integrally formed, and therefore relatively fixed, then the above described configuration of gap 20 must be incorporated in the fabricated shape of means 16. In this case the only force narrowing gap 20 would be the transverse restorative force of deformed engagement means 16, unless means 16 are fabricated so that the width 52 of gap 20 at end 51 approaches or reaches zero.

The configuration for anchoring means 17 must meet a minimum of three constraints. First, means 17 must be configured so that force 47 is transmitted to means 16. Second, means 17 must be configured so that an adequate amount of force can be transmitted through engagement means 16 to line 13. Third, in the event that means 16 and means 17 are not fabricated from a unitary body, means 17 must be configured to so as to restrain means 16, while device 11 is both in and out of service. As shown in FIGS. 1–3, the precise manner in doing so is dictated by the precise configuration of anchoring means 17, which may be either rigid or flexible.

Accordingly, within the above broadly defined constraints, a variety of complex configurations of engagement means 16, anchoring means 17 and gap 20 could be constructed. Device 11 could be fabricated from substantially rigid material so that engagement means 16 would be fixed relative to anchoring means 17, thereby requiring that the desired configuration for gap 20 be fixed in the design of engagement means 16. Similarly a piece of material (not shown) could be placed at end 51 of gap 20 to aid in the securing of line 13.

As described above, the subject invention 10 comprises a device 11 with a mechanical advantage of one, and method 12 comprising a coupling between a rope 13 and a force applying device 11 that could also be used to improve any force applying device that works by effecting incremental pulls, regardless of the degree of mechanical advantage. Certain embodiments of the device 11 could also be used to improve any force applying device that works by effecting incremental pulls, regardless of the degree of mechanical advantage. In fact, the device 11 of the subject invention could be used in conjunction with some of the prior art devices in the wind surfing field, described in the background section of this application, to make them more effective. Additionally, alternative embodiments of the device 11 could also be used in a load bearing rather than force applying, mode.

As the device 11 acts directly on the line 13 being tensioned, the configuration of the mast base 37 is unimportant to the subject invention 10. Device 11 may be moved along the line 13, after line 13 is engaged by securing means 42, to provide a new purchase point 26, without device 11 being disengaged from line 13, without the loss of tension in line 13.

The portability of device 11 opens the possibility of having it readily available if conditions warrant a readjustment of down haul 13a tension. Current tools are not taken with the wind surfer out on the water. Device 11 could be secured in the pouch available on many wind surf harnesses, or in a dedicated place sewn into the sail 40, harness, mast protector or other place, for use between sails.

All embodiments of the subject invention 10 shown in FIGS. 1–4 have the following advantages:

1) Fast attachment of a rope 13, or line 13a, to device 11.
2) Fast repositioning of device 11 to a new purchase point 26 on the rope 13 being tensioned, without device 11 being detached from the rope 13, or line 13a to which it is attached, to effect easy incremental pulls.
3) Fast detachment of a rope 13 from device 11.
4) Relatively non-destructive grasping of the line 13a being tensioned by the device 11, particularly when compared with the cleats known in the prior art.
5) A safe secure grip for the user while the device 11 is in use.

Figure 5:
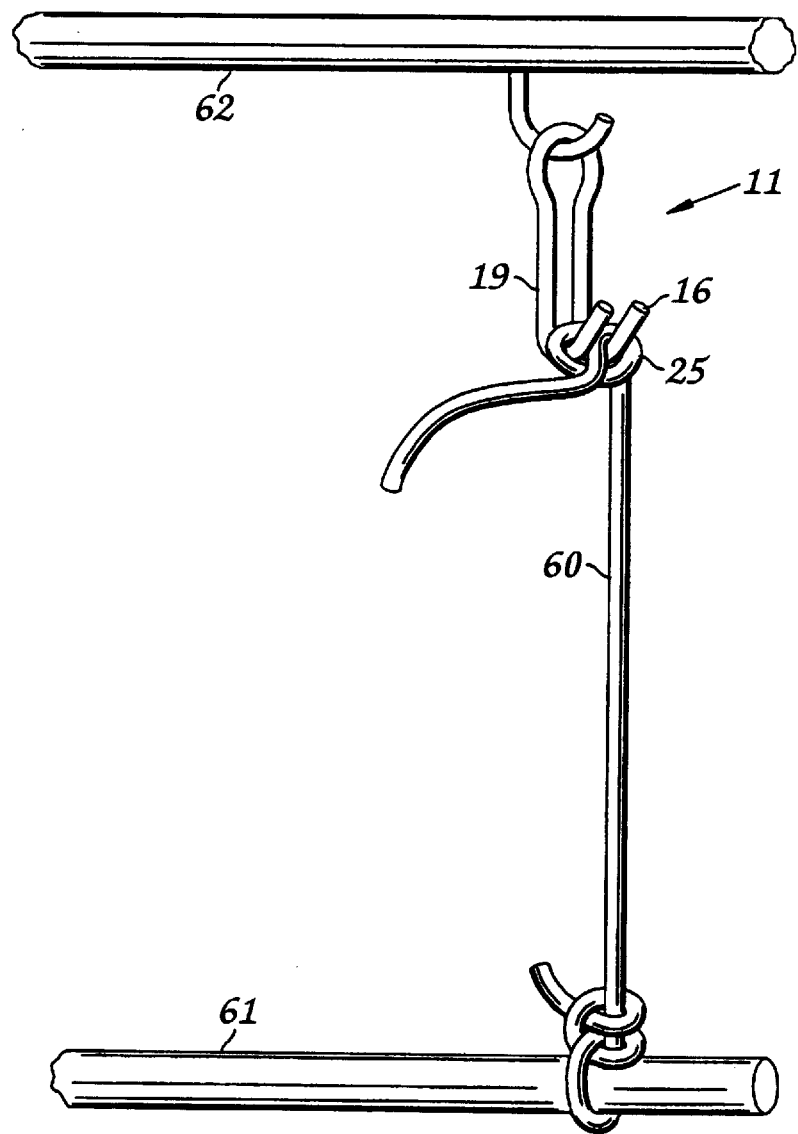
FIG. 5 Shows the load bearing application of the subject invention wherein the engagement means comprise hook means.

An alternative embodiment of device 11 is shown in FIG. 5. In this configuration, device 11 is operatively connected to a line which may have no substantial degree of tension 60, by means of engagement means 16. Device 11 is engaged to line 60 by means of hitch 25, as shown in FIGS. 1–4. Line 60 may then be tightened by having a portion of line 60 pass through engagement means 16 while the free end of line 60 is being pulled. In this case device 11 is carrying a load 61 connected to load carrying means 62 which are analogous and substantially similar to force applying means 17, which exerts force upon attachment means 19, which must passively hold onto line 60 and therefore be configured as a hook or similar device, and stay operatively connected to line 60 regardless from which side, or both, of device 11 that line 60 is tightened. As described above, the tension existing in the more highly tensioned portion of line 60 is maintained both after tensioning, and between intermittent increases of tension. The tension of line 60 can be increased until the tension on either side of device 11 is substantially equal.

This configuration allows for the device to be inserted into a line 60 prior to the line being tightened. Inasmuch as the identical hitch 25 is employed, the advantages which accrue from the use of the device 11, as described above, still accrue. Tension can be applied from either side of device 11, while device 11 remains in place during the tensioning or tightening process, so long as the tension is applied to the less tensioned portion of line 60. Line 60 need only have sufficient initial slack, on one side of device 11 so that hitch 25 can be made from line 60 around engagement means 16 to come into engagement therewith.

From the foregoing, it is readily apparent that a tension adjusting device and methods embodying the use thereof have been described and illustrated which fulfills all of the afforestated objectives in a remarkably unexpected fashion. It is of course understood that such modifications, adaptations, and alterations as may readily occur to the artisan confronted with this disclosure are intended within the spirit of the present invention which is limited solely by the scope of the claims appended hereto.

Accordingly, I claim the following:

1. A line tensioning device comprising a force applying means which attaches to an engagement means comprising a first hook member and a second hook member with a gap in between said hook members, said hook members being substantially parallel and having a closed end forming a connecting means for joining to the force applying means and providing for the setting of the gap between said hook members and an open end which is an attachment means for said line, said connecting means allowing said gap between said hook members to narrow and be perpendicular to said line with a fixed end attached to a load and a free end wrapped one-and-one-half times around said attachment means and terminating in said gap which narrows when said force applying means is pulled, causing said line to be tensioned and a first wrap of the line to constrict around said hook members, forcing said hook members to converge, arresting the movement of said line occupying said gap.

2. A device according to claim 1 wherein said engagement means comprising said first hook member and said second hook member are each an independent hook with said connecting means wherein said hook members form said attachment means and said connecting means provide for the joining of said force applying means and the setting of said gap.

3. A device according to claim 2 wherein said force applying means is a handle whose construction provides for the setting of said gap and locating of said engagement means in the center of said handle.

4. A device according to claim 1 wherein said engagement means is formed from one piece of material including said connecting means and said attachment means of said first hook member and said second hook member, said hook members are joined by said connecting means which presets said gap.

5. A device according to claim 4 wherein said force applying means is a handle whose construction provides for the locating of said engagement means in the center of said handle.

6. A device according to claim 4 wherein said force applying means is a loop strap whose construction provides for the locating of said engagement means at one end of said loop strap.

7. A device according to claim 4 where the force applying means is a fixed anchor.

8. A method for making incremental pulls on a line to tension the line or displace a load using a device comprising a force applying means which attaches to an engagement means comprising a first hook member and a second hook member with a gap in between said hook members, said hook members being substantially parallel and having a closed end forming a connecting means for joining to the force applying means and providing for the setting of the gap and an open end which is an attachment means for said line, said connecting means allowing said gap between said attachment means to narrow and be perpendicular to said line with a fixed end attached to a load, and consists of the following steps:

(i) wrap a free end of said line one-and-one-half wraps around said attachment means, terminating in said gap between said attachment means;

(ii) pull said force applying means causing said line to be tensioned and displacing said device an incremental distance from a starting point;

(iii) secure said tensioned line or secure said load;

(iv) tension said free end while simultaneously advancing said device toward said starting point until reaching said starting point.

(v) repeat steps ii–iv until the desired tension is accumulated or said load is displaced the required distance.

9. A method for anchoring a tensioned line using a device comprising a force applying means which attaches to an engagement means comprising a first hook member and a second hook member with a gap in between said hook members, said hook members being substantially parallel and having a closed end forming a connecting means for joining to the force applying means and providing for the setting of the gap and an open end which is an attachment means for said line, said connecting means allowing said gap between said attachment means to narrow and be perpendicular to said line with a fixed end attached to a load, and consists of the following steps:

(i) secure said force engagement means to a fixed anchor;

(ii) wrap a free end of said line one-and-one-half wraps around said attachment means, terminating in said gap between said attachment means;

(iii) tension said free end of said line;

(iv) slack said free end allowing said device to hold said line in tension.

\* \* \* \* \*